Figure 1:
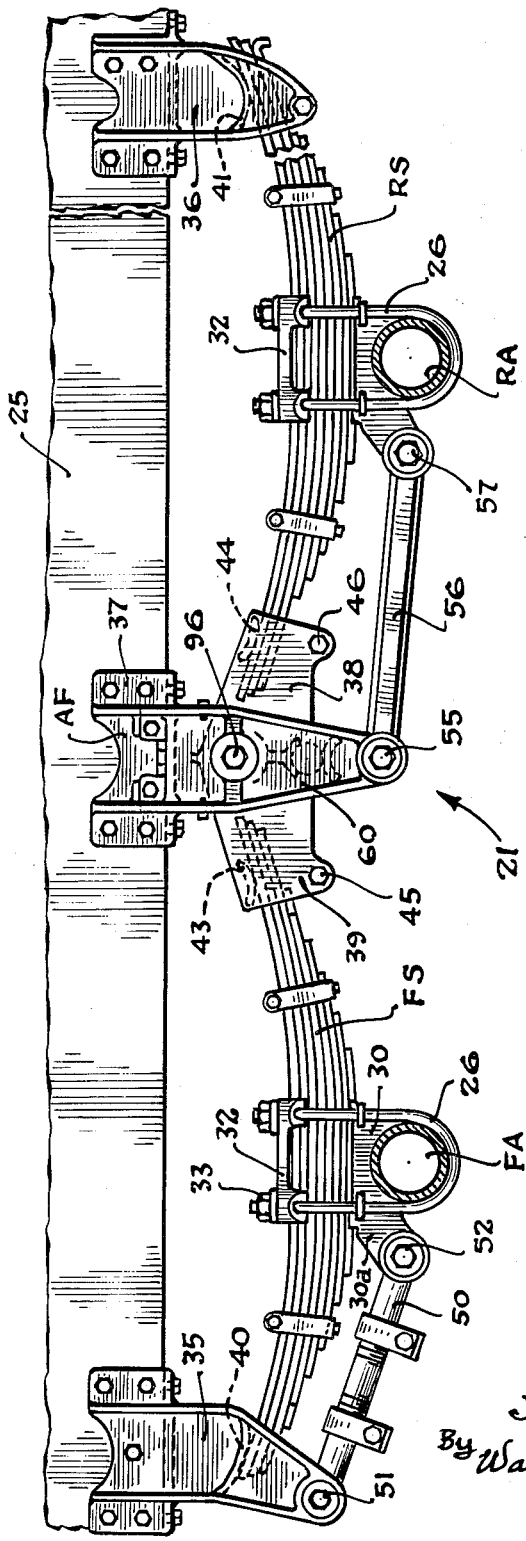

Dec. 7, 1965  J. E. RAIDEL  3,222,082
TANDEM SUSPENSIONS
Filed Oct. 8, 1963  2 Sheets-Sheet 1

Inventor
John E. Raidel
By Wallace, Kinzer and Dom
Attorneys

Inventor
John E. Raidel
By Wallace, Kinzer and Dorn
Attorneys 3,222,082
TANDEM SUSPENSIONS
John E. Raidel, Springfield, Mo., assignor to A. J. Industries, Inc., Springfield, Mo., a corporation of West Virginia
Filed Oct. 8, 1963, Ser. No. 314,735
5 Claims. (Cl. 280—104.5)

This invention relates to an equalizer beam supporting structure employing resilient bearings, and more particularly to a structure adapted for supporting for oscillatory movement an equalizer beam of a tandem spring suspension for trucks or truck trailers.

Most commonly, heavy-duty trailers of the type employed in overland cargo hauling are equipped with two axles at the rear, and the axles are associated with a tandem suspension having a pair of semi-elliptical springs with adjacent ends engaged with an equalizer beam suspended from the frame of the vehicle. The arrangement is such that the ends of the elliptical springs for the axles engage opposite ends of the equalizer beam so that when a load engendered by impact is impressed upon one axle and spring, the equalizer beam is pivoted by this spring to distribute the load to the other spring associated with the equalizer beam.

The equalizer beam and a related shaft are supported in an equalizer hanger bracket, being pivotally mounted therein for oscillation by the adjacent ends of the elliptical springs when loaded. Heretofore, resilient or rubber-type bearings for the equalizer have been associated with the equalizer bracket, and have been subjected to torque stresses by the equalizer beam and supporting shaft, turning relative thereto when the suspension is in operation. Additionally, the rubber bearings are purposely subjected to a compressive force applied axially to expand the bearings against the retaining seats associated therewith and against the equalizer supporting shaft in order to securely hold the bearings in place and to impart control over equalizer oscillation. Thus, the portion of the rubber bearing engaging the equalizer beam normally turns or winds up with the equalizer beam when the equalizer pivots, whereas that portion of the bearing between the retaining seats and the equalizer shaft tends to resist turning so that, the rubber bearings will be subjected internally to a torque stress which causes undesired shearing or rupturing of the bearings.

Accordingly, a principal object of the present invention is to eliminate this internal rupturing or fracturing of resilient bearings by employing a new and improved equalizer supporting assembly or structure employing separate or split resilient bearings.

More specifically, and in accordance with a further object of the present invention, the bearing means for the equalizer beam is separated into two separate portions comprising inner bearings for absorbing the turning torque of the equalizer beam and outer bearings for supporting the equalizer shaft.

A further object of the present invention is to enable the outer bearings to exert compression forces on the internal bearing for the equalizer while employing low friction interfaces between the bearings so that the bearings are able to turn relatively freely without imparting a twisting or turning force to the opposite bearing. Thus, the internal bearing is free to turn with the equalizer beam relative to the outer bearings held within the bores of the bosses on the equalizer bracket.

A more specific object of the present invention is an equalizer beam support employing separate bearings of a rubber type having bonded or secured thereto end faces of a low friction plastic or the like material whereby one bearing is able to turn relatively freely relative to an abutting bearing.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles, and other embodiments of the invention embodying the same or equivalent principles may be used and structural changes may be made as desired by those skilled in the art without departing from the present invention and the purview of the appended claims.

Figure 2:
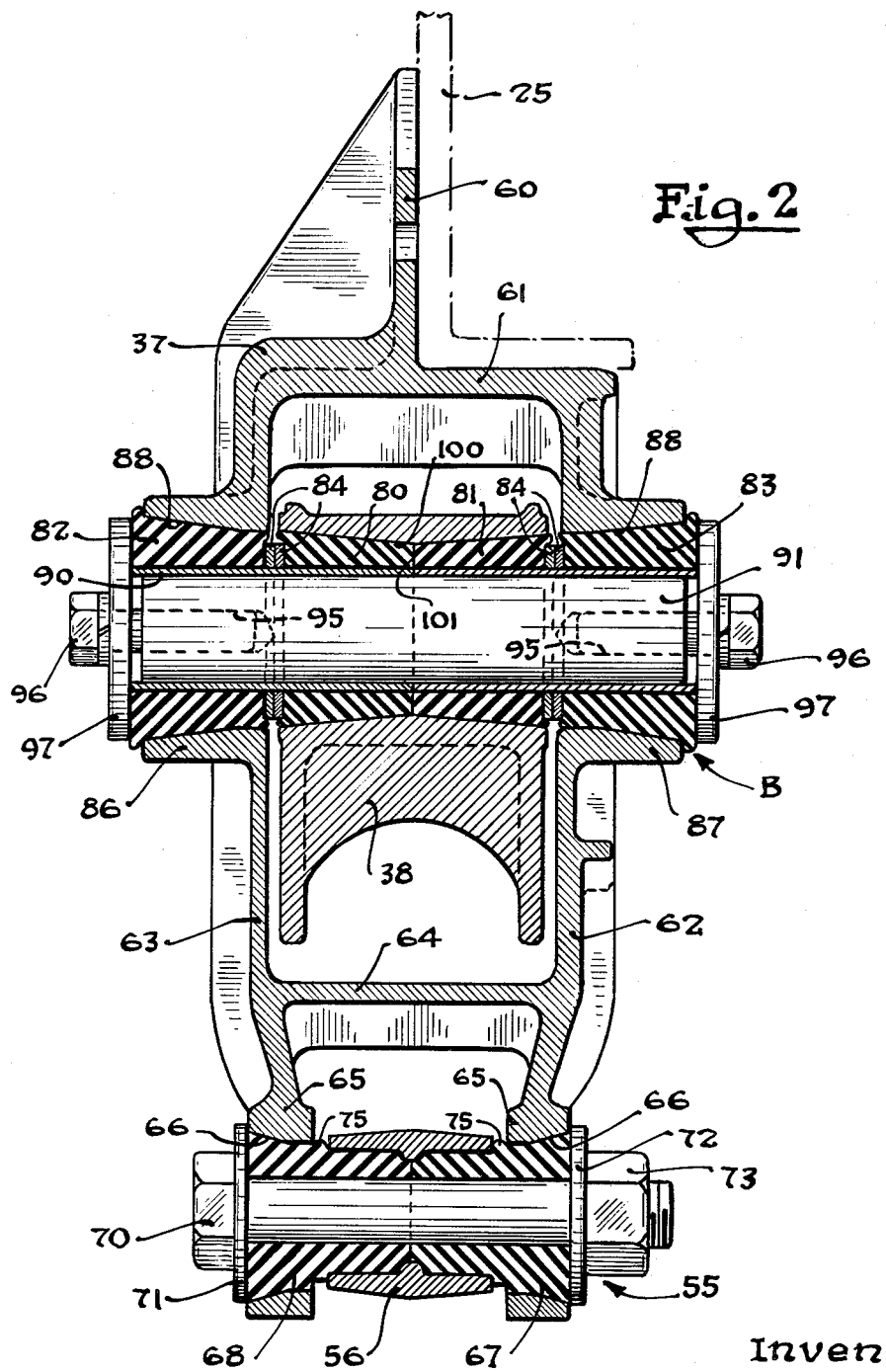

In the drawings:

FIG. 1 is a side elevational view of a tandem suspension in which the present invention may be advantageously embodied; and FIG. 2 is an enlarged sectional view of an equalizer supporting assembly employing the present invention.

For purposes of disclosure, the invention is illustrated herein as embodied in a heavy-duty trailer, the rear end of which is supported by a tandem 21 associated with the trailer by means of a conventional running gear frame 25 which is adapted to be secured to the trailer body. The tandem 21 embodies a front axle FA and a rear axle RA that are related to the frame 25 by equalized spring means of the semi-elliptic type, namely, a semi-elliptic front spring FS and a semi-elliptic rear spring RS.

While only side member of the running gear frame 25 has been shown, it is to be understood that on the opposite side of the truck there is embodied a substantially similar side member of the running gear frame 25 and that the other side member supports semi-elliptical springs and the opposite ends of the axles FA and RA.

While not shown, double wheels are normally rotatably mounted on each end of the front axle FA, and each end of the rear axle RA. The semi-elliptical springs FS and RS, respectively, are fixedly secured to their respective axles FA and RA by means of U bolts 26 extending between by an upper clamping plate 32 and a lower axle holder 30. The U bolts 26 extend upwardly through openings in the upper clamping plates 32 and have fastening nuts 33 tightened on their upstanding threaded ends in order to clamp the axles to the springs.

In relating the front and rear springs FS and RS to the running gear frame 25, an equalizing means is afforded, and as herein shown, this equalizing means is afforded, and as herein shown, this equalizing means is disposed between the adjacent ends of the springs FS and RS. For the purposes of supporting the front portion of the spring FS, a front hanger bracket 35 is fixed in a depending relation on a frame 25 to receive the front end of a front spring FS in the conventional manner. Similarly, a rear hanger bracket 36 is fixed in a depending relation on the frame 25 to receive the rear end of a rear spring RS in the conventional manner. Intermediate the hangers 35 and 36, an equalizer bracket 37 is mounted so that a rocking equalizer beam 38 may engage the adjacent ends of the front and rear springs FS and RS in a conventional equalizing relation. While not shown, it is to be understood that a front hanger on the opposite side of the running gear frame 25 and aligned with the front hanger 35 is connected thereto by a transverse brace rod (not shown) and that the opposed equalized hanger brackets are likewise interconnected by a transverse brace rod as are the rear hanger brackets 36, all according to the usual practice.

The front hanger bracket 35 includes a downwardly directed arcuate bearing surface 40 against which the forward end of the spring FS is adapted to bear. A similar arcuate surface 41 is provided in the rear hanger bracket 36 and engages the end of the rear spring RS near the end thereof.

The equalizer beam 38 has a pair of opposed arcuately shaped bearing plates 43 and 44, respectively, for engaging the adjacent ends of the springs FS and RS, respectively. Normally, the adjacent ends of the springs FS and RS bear against the bearing plates 43 and 44, but in the course of operation it sometimes occurs that the adjacent ends of the springs move downwardly to contact sleeved bolts 45 and 46, which serve to limit the displacement of the adjacent ends of the spring from the equalizer 38.

In addition to the spring connections between the axles FA and RA to the brackets 35, 36 and 37, the axles FA and RA and their respective axle holders 30 are connected by torque arms 50 and 56 to the brackets 35 and 37, respectively. The front torque arm 50 is pivotally connected to the front hanger bracket 35 and the front axle holder 30 by adjustable torque joints 51 and 52, respectively, of any conventional form. Likewise, the torque arm 56 is pivotally mounted on the equalizer bracket 37 and the axle holder by adjustable torque joints 55 and 57, respectively.

In the conventional manner, the equalizer beam 38 can be rotated by either one of the springs FS or RS to transfer a portion of an impressed load to the other of the springs, and thereby to its supported axle, so that no single axle and set of wheels supports the entire weight of the truck, even though one of the wheels may have hit a bump and be raised relative to the other wheels.

The above described tandem suspension 21 of FIG. 1 is a conventional suspension that forms the environmental setting for the equalizer beam supporting means shown in FIG. 2. The equalizer supporting bracket 37 containing the equalizer supporting means has an attaching flange 60 shown secured to the running gear frame 25.

The equalizer supporting bracket 37 is a one-piece casting having a top wall 61, opposed side walls 62 and 63, and a bottom wall 64 enclosing on four sides an interior cavity in which rotates the equalizer beam 38. Extending downwardly from the bottom wall 64, the equalizer bracket 37 has a pair of spaced legs 65 which have aligned seats therein for receiving a pair of opposed resilient or rubber bearings 67 and 68. The rubber bearings 67 and 68 are part of the supporting joint 55 for the torque arm 56. The joint 55 consists of a bolt 70 inserted through a first washer 71 and through the bearings 67 and 68 into a second washer 72, and into a threaded nut fastener 73. The tightening of the fastener 73 on the threaded ends of the bolt 70 causes the washers 71 and 72 to move axially inward toward one another, and thereby to compress the rubber bearings 67 and 68 radially so as to grip the torque arm 56 with a predetermined amount of force.

Heretofore, a conventional form of bearing for the equalizer beam 38 has been constructed in a manner similar to the construction of the rubber bearings 67 and 68 for the torque arm 56. As shown in FIG. 2. As will be appreciated, the turning of the torque arm 56 causes the portions of the bearing with which it is in contact to turn or twist therewith, whereas the portions of the bearings 67 and 68 engaging the walls of the apertures 66 and the arm 65 are held by a stationary or non-moving member so that at the points 75 shown by the bulges, the rubber bearings undergo a shearing type of action between a turning portion and a portion resisting the turn. It is at such a point (75) that ruptures or fractures most frequently occur in resilient bearings, and once having occurred, tend to wear away portions of the bearing underneath the torque arm 56. Furthermore, gaps are created by the ruptures whereby the outer portions of the bearings are no longer able to compress the inner portions of the bearings.

To alleviate such breaking down of conventional, one-piece bearings for an equalizer beam, the present invention employs a pair of inner, beam-supporting bearings 80 and 81, and outer, shaft-supporting bearings 82 and 83, each of which bearings has affixed thereto a low friction face 84.

More specifically, the side walls 62 and 63 of the bracket 37 have exteriorly extending bosses 86 and 87 with inwardly and convergingly tapered bores 88 for receiving the shaft-supporting bearings 82 and 83. The bearings 82 and 83 are bonded or secured in a suitable manner to an equalizer cylinder 90, in which is positioned a solid shaft 91 extending between the two bosses 86 and 87. The cylinder 90 and shaft 91 constitute a shaft means for supporting the equalizer beam 38. The shaft 91 is a solid member being tapped at 95 to receive the threaded ends of opposed bolts 96. Tightening of the bolts 96 in the tapped holes 95 of the equalizer-supporting shaft 91 causes the cylindrical washers 97 carried on the bolts 96 to force the tapered bearings 82 and 83 to move down the tapered bores 88 and thereby exert a greater compressive loading on the bearings 82 and 83, causing the bearings to grip more tightly the equalizer beam 38. That is, the faces 84 on the bearings 82 and 83 push axially on the faces 84 of the bearings 80 and 81 to compress the bearings 80 and 81, and thereby cause the bearings to expand radially to grip the equalizer beam 38 more tightly.

The equalizer beam 38 has a bore 100 therein, the side walls of which flare outwardly from a medial portion having the smallest diameter, at which is the interface 101 of the two internal bearings 80 and 81. Thus, as the bolts 96 are tightened, the equalizer-supporting bearings 80 and 81 are subjected at the interface 101 to tighter engagement with one another.

The amount of preloading or compressing of the bearings 80 and 81 determines how much of the turning torque will be imparted by the equalizer 38 into a twisting or turning force within the internal bearings 80 and 81. When a greater torque is exerted than that for which the bearings 80 and 81 have been preloaded, the equalizer beam 38 will slip or turn freely relative to the equalizer-supporting bearings 80 and 81. The bearings 80 and 81 are bonded or suitably secured in a convenient manner to the cylinder 90 and hence do rotate relative thereto.

As the bearings 80 and 81 twist with the oscillation of the equalizer beam 38, their respective low friction faces 84 are able to turn relatively freely against the low friction faces 84 of the shaft-supporting bearings 82 and 83. The low friction faces 84 are characterized by a low friction material separating the interior equalizer-supporting bearings 80 and 81 from the shaft-supporting bearings 82 and 83. Preferably, the low friction faces 84 are nylon, Teflon or other suitable plastic materials which can be directly molded or bonded to their respective bearings. However, the low friction faces 84 could be made of low friction metallic surfaces, plastic surfaces, or merely low friction coatings applied to the ends of the bearings.

It will be understood that the equalizer bearings 80 and 81 turn or twist the greatest degree at their outer surfaces which are in engagement with the bore 100 of the equalizer shaft 38, and that less turning or twisting is taking place at those portions bonded to the cylinder 90. Thus, if bearings 80 and 81 turn the cylinder 90, the cylinder 90 imparts less twisting or turning to the shaft-supporting bearings 82 and 83 than would be applied directly thereto, if the bearings 80 and 82 and the bearings 81 and 83 were unified, respectively. The interior portions of the bearings 81 and 83 are turned by the cylinder 90 to a greater extent than are their respective outer portions in engagement with the bores 88 in the bosses 86 and 87. The end bearings 82 and 83 undergo less internal shear and are not subject to forces and fatigue as if joined to their respective interior equalizer-supporting bearings 80 and 81, respectively.

The place of greatest shear and rupture of the one-piece supporting bearings was at the points where the faces 84 are now employed, since it was at these points that the outer surfaces of the interior portions of the bearings were being twisted to a high degree by the equalizer 38 while immediately adjacent thereto. The outer portion of the bearings in the bore 88 were being held by the bosses 86 and 87 against movement. This caused internal fatigue and in time fracturing or shearing at these points in one-piece bearings. Thus, with the low friction faces 84 being employed between separate bearings 80 and 82, and 81 and 83, respectively, the equalizer beam supporting bearings 80 and 81 do not directly impart such a twisting to the shaft-supporting bearings 82 and 83, since the low friction faces 84 will turn freely relative to one another and impart relatively insignificant twisting forces to the shaft-supporting bearings 82 and 83.

From the foregoing, it will be seen that the separating of the bearings into the separate functions, namely, the interior bearings serving as equalizer bearings, and the outer bearings serving as shaft supporting bearings, reduces the amount of internal shear or fracturing of bearings caused when a bearing had to perform both of these functions. Additionally, the outer bearings or shaft supporting bearings are still able to perform the function of preloading the interior bearings to a predetermined amount by pushing against the faces thereof without being subjected to a twisting force due to the low friction faces 84 applied at the inner faces between the equalizer supporting bearings and the shaft supporting bearings.

Hence, while I have illustrated and described preferred embodiments of the present invention, it is to be understood that these are capable of variation and modification, and I therefore do not wish to be limited to the precise details set forth, but desire to avail myself of such changes and alterations as fall within the purview of the following claims.

I claim:

1. In a tandem suspension of the kind described wherein the tandem suspension is adapted to be secured to the frame of a vehicle and wherein elongated spring means have adjacent inner ends thereof engaging an equalizer beam, an equalizer bracket for attachment to the frame of the vehicle, a shaft means in said bracket for pivotally mounting said equalizer beam; resilient bearing means on said shaft means for supporting said equalizer beam for oscillatory movement within said supporting bracket; shaft supporting bearings disposed in said equalizer supporting bracket and supporting said shaft means for turning movement, said shaft supporting bearings having inner ends adapted to be abutted against opposed ends of said equalizer supporting bearings to load said equalizer supporting bearing means with predetermined compression forces; and a bearing separating means of a lower friction material than the resilient bearing material disposed between and secured to each of the opposed ends of said supporting bearing means and said shaft supporting bearing means.

2. In a tandem suspension of the kind described wherein the tandem suspension is adapted to be secured to the frame of a vehicle and wherein elongated spring means have adjacent inner ends thereof engaging and equalizer beam, an equalizer bracket for attachment to the frame of the vehicle and presenting a pair of bores, a pair of resilient bearings secured to said shaft means and supporting said equalizer beam for rotational movement, said bearings being abutted at a medial interface; a face of low friction material on an opposite end of each of said equalizer supporting bearings; shaft supporting bearings of a resilient material secured to said shaft means and disposed in said bores within said equalizer supporting bracket and supporting said shaft; a face of lower friction material than the resilient bearings being disposed on the interior end of each of said shaft supporting bearings and adapted to be in engagement with a respectively opposite low friction face on a respectively opposite equalizer supporting bearing; and means for compressing said shaft supporting bearings to cause a predetermined amount of compressive force within said shaft supporting bearings, said shaft supporting bearings exerting a compressive force on said equalizer supporting bearing through said respectively associated low friction faces.

3. The equalizer supporting bracket of claim 2 wherein said low friction faces are made of a plastic material and are bonded to their respective bearings.

4. In a tandem suspension for attachment to the frame of a vehicle wherein an equalizer beam is provided, an equalizer supporting bracket having a pair of opposed bosses presenting a pair of bores therein leading to an interior cavity in which an equalizer beam oscillates, shaft supporting bearings of a resilient material adapted to be disposed in said opposed bores in said bosses of said equalizer supporting bracket; shaft means supportable within said shaft supporting bearings; each of said shaft supporting bearings having on its interior end wall an annular face of low friction material directed towards the interior cavity; a pair of equalizer supporting bearings of resilient material carried on said shaft means for supporting said equalizer beam and adapted to have their respective interior end walls abutted together; said equalizer supporting bearings having opposite end walls each with an annular face of a low friction material engageable with the low friction material on a respectively opposite shaft supporting bearing; and adjusting bolt means on the opposite ends of said shaft means for preloading said shaft supporting bearings and said equalizer supporting bearings with predetermined compressive forces.

5. The supporting means of claim 4 wherein said shaft means includes a hollow cylinder and a solid shaft disposed within said cylinder, said shaft supporting bearings and said equalizer beam supporting bearings being secured to said cylinder.

References Cited by the Examiner
UNITED STATES PATENTS 2,308,967  1/1943  Kuss _____ 267—54
3,117,799  1/1964  Bahnke _____ 280—104.5

PHILIP ARNOLD, *Primary Examiner.*

A. HARRY LEVY, *Examiner.*